(12) United States Patent
Allier et al.

(10) Patent No.: US 10,754,141 B2
(45) Date of Patent: Aug. 25, 2020

(54) DEVICE FOR OBSERVING A SAMPLE AND METHOD FOR OBSERVING A SAMPLE

(71) Applicant: COMMISSARIAT A L'ENERGIE ATOMIQUE ET AUX ENERGIES ALTERNATIVES, Paris (FR)

(72) Inventors: Cedric Allier, Grenoble (FR); Thomas Bordy, Grenoble (FR); Olivier Cioni, Grenoble (FR); Lionel Herve, Corenc (FR); Sophie Morel, Douai (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/337,153

(22) PCT Filed: Sep. 27, 2017

(86) PCT No.: PCT/FR2017/052625
§ 371 (c)(1),
(2) Date: Mar. 27, 2019

(87) PCT Pub. No.: WO2018/060619
PCT Pub. Date: Apr. 5, 2018

(65) Prior Publication Data
US 2020/0033580 A1    Jan. 30, 2020

(30) Foreign Application Priority Data

Sep. 30, 2016 (FR) ..................... 16 59432

(51) Int. Cl.
*G02B 21/36* (2006.01)
*G02B 21/06* (2006.01)
(Continued)

(52) U.S. Cl.
CPC ........... *G02B 21/367* (2013.01); *G02B 21/06* (2013.01); *G02B 21/361* (2013.01); *G02B 21/362* (2013.01)

(58) Field of Classification Search
CPC .... G02B 21/367; G02B 21/06; G02B 21/361; G02B 21/362; G02B 21/00; G02B 21/36; G02B 21/364; G02B 21/365
See application file for complete search history.

(56) References Cited

U.S. PATENT DOCUMENTS

2011/0058253 A1* 3/2011 Karasawa ............... G02B 21/06
                                                                359/385
2014/0248713 A1* 9/2014 Allier ..................... G02B 27/42
                                                                436/501
(Continued)

FOREIGN PATENT DOCUMENTS

FR        3 030 748 A1    6/2016
WO    WO 2014/118263 A1   8/2014
WO    WO 2016/107995 A1   7/2016

OTHER PUBLICATIONS

International Search Report issued Jan. 19, 2018 in PCT/FR2017/052625 filed Sep. 27, 2017.

*Primary Examiner* — Alexander Gee
(74) *Attorney, Agent, or Firm* — Oblon, McClelland, Maier & Neustadt, L.L.P.

(57) ABSTRACT

There is provided a device allowing a sample to be observed in a first mode, by lensless imaging using a first sensor. The first mode allows a first image to be obtained, on the basis of which a region of interest of the sample may be identified. The device then allows, via a relative movement, the region of interest to be analyzed using a more precise second mode and in particular using an optical system coupled to a second sensor.

16 Claims, 9 Drawing Sheets

Figure 1A:
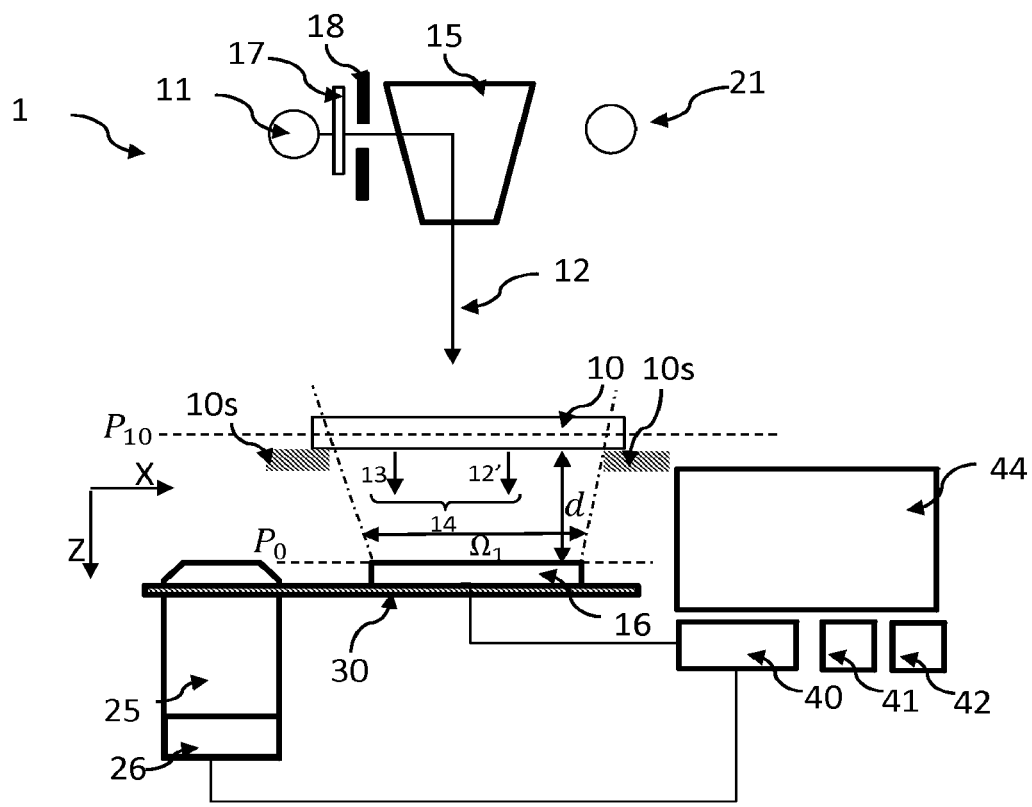

(51) Int. Cl.
*G03H 1/08* (2006.01)
*G01N 15/14* (2006.01)
*G03H 1/04* (2006.01)
*G03H 1/00* (2006.01)
*G02B 21/14* (2006.01)

(56) References Cited

U.S. PATENT DOCUMENTS

| | | | |
|---|---|---|---|
| 2014/0313312 A1* | 10/2014 | Gaiduk | H04N 5/23209 |
| | | | 348/79 |
| 2015/0153558 A1* | 6/2015 | Ozcan | G01B 9/04 |
| | | | 348/79 |
| 2015/0198794 A1* | 7/2015 | Rondeau | G02B 21/0048 |
| | | | 359/390 |
| 2016/0011117 A1 | 1/2016 | Strola et al. | |
| 2017/0356846 A1 | 12/2017 | Genuer et al. | |
| 2017/0363533 A1 | 12/2017 | Perraut et al. | |

\* cited by examiner

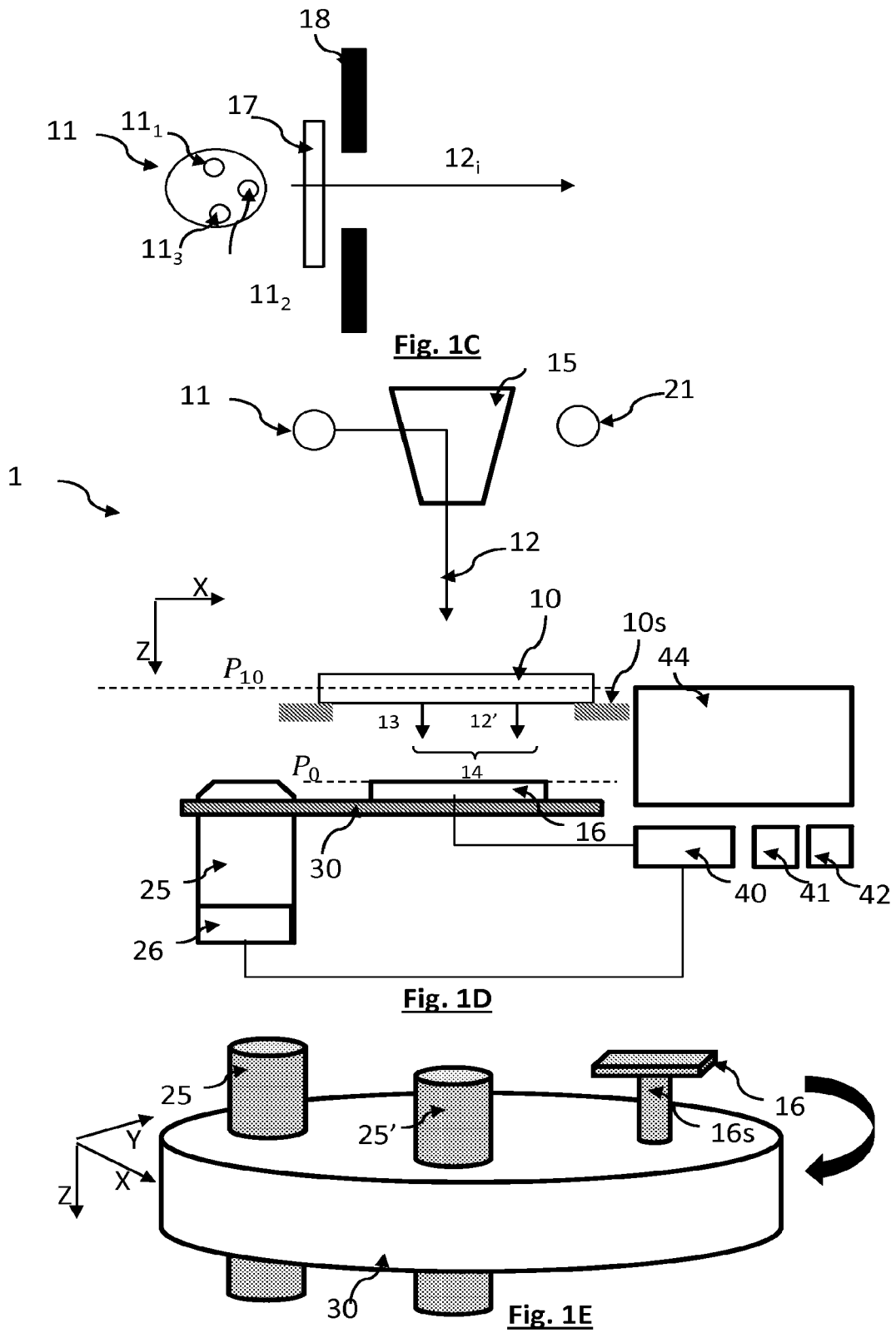

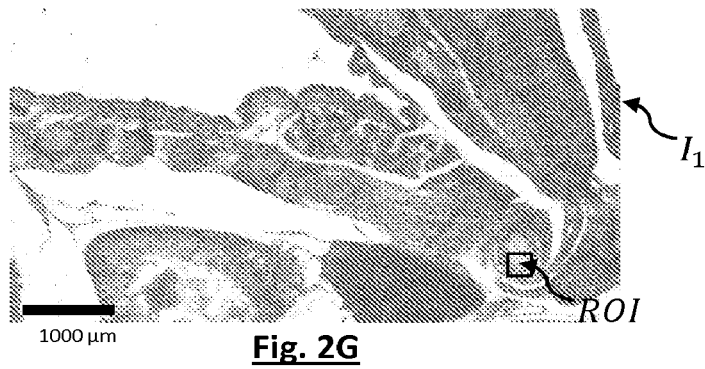
Fig. 2G
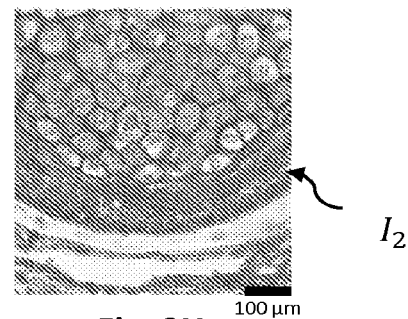
Fig. 2H
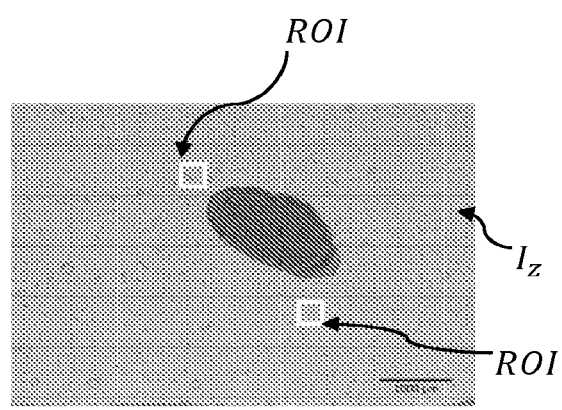
Fig. 3A
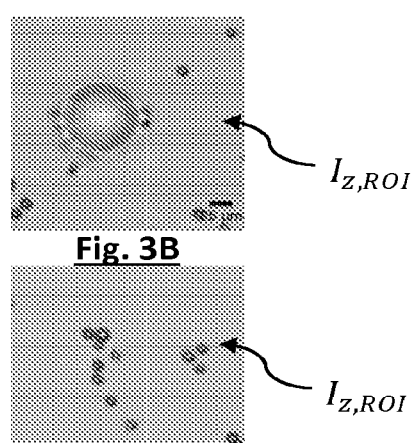
Fig. 3B
Fig. 3C
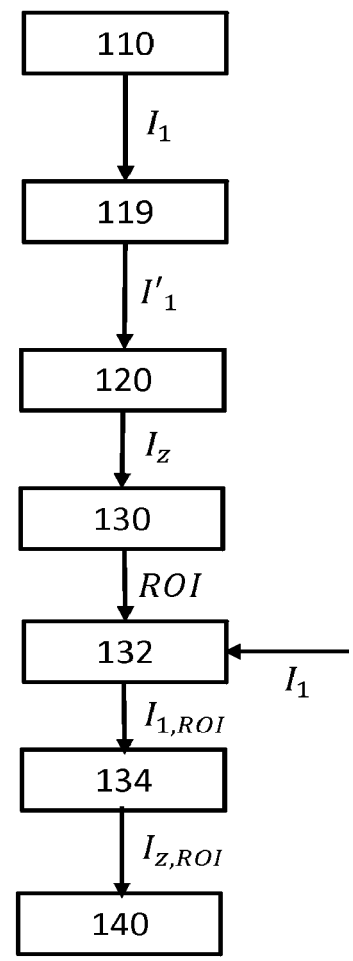
Fig. 3D

US 10,754,141 B2

DEVICE FOR OBSERVING A SAMPLE AND METHOD FOR OBSERVING A SAMPLE

TECHNICAL FIELD

The technical field of the invention is microscopy, combining a conventional mode with magnifying optical objective and a lensless imaging mode.

PRIOR ART

The observation of samples, and in particular biological samples, by lensless imaging has seen substantial development over the last ten years. This technique allows a sample to be observed by placing it between a light source and an image sensor, without any magnifying optical lens between the sample and the image sensor. Thus, the image sensor collects an image of the light wave transmitted by the sample. This image, which is also called a hologram, is formed from interference patterns generated by interference between the light wave emitted by the light source and transmitted by the sample, and diffracted waves resulting from the diffraction, by the sample, of the light wave emitted by the light source. These interference patterns are sometimes referred to as diffraction patterns.

Document WO2008090330 describes a device allowing cell-containing samples to be observed by lensless imaging. This document demonstrates that lensless imaging may be used for the microscopy purposes, to count cells. This document also demonstrates that, on the basis of a morphological analysis of diffraction patterns, certain cells may be identified.

Document WO2014118263 describes a device combining a lensless-imaging mode and a conventional-imaging mode implementing a magnifying optic. Document WO2016/107995 describes a method for locating a transparent or translucent particle. This method is based on the acquisition of an unfocused image of the particle, and on use of a holographic reconstruction to obtain a precise position of the particle in the sample. An optical system, which is coupled to a laser source, is then moved so that the particle is placed in the focal plane of the optical system, so as to optimize the focus of the laser beam, produced by the laser source, on the particle.

One of the advantages of lensless imaging is that it allows quality images to be obtained while preserving a field of observation that is clearly larger than that of a microscope. However, holograms do not allow cells, or other scattering elements of a sample, to be reliably observed when the concentration thereof is high. Holograms may then be processed using a holographic reconstruction algorithm to obtain a reconstructed image representing a characteristic, for example the modulus or phase, of the light wave passing through the sample and propagating towards the image sensor. This type of algorithm is well known in the field of holographic reconstruction. One example holographic-reconstruction algorithm is described in the publication Ryle et al, "Digital in-line holography of biological specimens", Proc. Of SPIE Vol. 6311 (2006). However, such an algorithm may give rise, in the reconstructed image, to the appearance of a type of reconstruction noise referred to as "twin images".

Patent application US2012/0218379 describes a method allowing a complex image of a sample to be reconstructed, this image containing amplitude and phase information, thereby limiting twin-image formation. Patent application US2012/0148141 applies the method described in patent application US2012/0218379 to reconstruction of a complex image of spermatozoa and to characterization of the mobility thereof. The latter patent application describes what is referred to as a tracking algorithm, allowing the path of the spermatozoa to be followed.

The inventors propose an observing device and method allowing the field of observation made possible by lensless imaging to be combined with a finer analysis made possible by a preciser observation mode.

SUMMARY OF THE INVENTION

A first subject of the invention is a device for observing a sample comprising:
  a holder, intended to hold the sample;
  a first light source, able to emit an incident light wave that propagates to the sample;
  a first image sensor, able to acquire a first image of the sample illuminated by the incident light wave, the holder being configured to hold the sample between the first light source and the first image sensor in such a way that no magnifying optics are placed between the sample and the first image sensor, the first image sensor being exposed to a light wave called the exposure light wave, the first image defining a first field of observation of the sample;
the device also comprising:
  a second image sensor, optically coupled to an optical system having a magnification higher than 1, so as to acquire a second image of the sample, held on the holder, in a second field of observation that is smaller than the first field of observation.

The optical system may notably be an objective, for example a microscope objective, of magnification higher than 5, or even higher than 10.

The device may comprise a second light source able to illuminate the sample during the acquisition of the second image of the sample. The second light source may be none other than the first light source.

The device may comprise a mechanism for moving the sample relative to the first image sensor and to the optical system, so as to alternate between:
  a first mode, in which the sample is placed in the field of observation of the first image sensor, so as to acquire the first image;
  a second mode, in which the sample is placed in the field of observation of the second image sensor, so as to acquire the second image.

The moving mechanism may be a stage that is able to be translated or to rotate.

The device may comprise:
  a selector, able to allow a region of interest in the first image to be selected. The selector may be manually actuatable. It may notably be a computer peripheral such as a mouse or keyboard.
  a processor, configured to determine a relative position of the sample with respect to the optical system, in which position the selected region of interest lies in the second field of observation;
such that the moving mechanism is configured to automatically position the sample relative to the optical system in said relative position determined by the processor. Thus, the region of interest of the sample may be observed by the second image sensor, through the optical system.

The device may comprise a processor configured to apply a numerical propagation operator to the first image, so as:

to calculate a complex expression for the exposure light wave on a reconstruction surface, and notably a reconstruction plane, lying facing the first image sensor, defining a complex image; and to form an image, called the reconstructed image, from the modulus and/or phase of said complex expression, such that, in the second mode, such that the position of the sample with respect to the optical system is defined depending on a region of interest selected in the reconstructed image.

By reconstructed image, what is meant is an image representing the modulus of the exposure light wave, or the phase of the exposure light wave, or a combination thereof, the reconstructed image being formed from the complex image obtained by applying the numerical propagation operator to the first image.

According to one embodiment, the first image sensor lies in a detection plane, and the device comprises a processor configured to apply a digital focus (or digital autofocus) to the first image so as to estimate a distance between the sample and the detection plane in the region of interest, such that the relative position of the sample with respect to the optical system is determined depending on the distance thus estimated.

According to one embodiment, the first image sensor and the second image sensor are fixed and the moving mechanism is able to move the sample:
  to facing the first image sensor in the first mode;
  and/or to facing the optical system in the second mode.

According to one embodiment, the sample is fixed; and the moving mechanism is able to:
  move the first image sensor in order to bring it to facing the sample, in the first mode;
  and/or to move the optical system, and optionally the second image sensor, in order to bring it to facing the sample, in the second mode.

Another subject of the invention is a method for observing a sample, comprising the following steps:
  a) illuminating the sample using a first light source;
  b) acquiring an image of the sample, called the first image, using a first image sensor, the image sensor being exposed to a light wave, called the exposure light wave, the sample being held between the first light source and the first image sensor, no magnifying optics being placed between the first image sensor and the sample;
  c) selecting a region of interest of the sample in the first image.

According to one embodiment, the method also comprises the following steps:
  d) moving the sample relative to an optical system, notably an objective, having a magnification higher than 1, the optical system being optically coupled to a second image sensor, the movement being carried out automatically by a moving mechanism, such that the region of interest of the sample is located in a field of observation, called the second field of observation, of the second image sensor;
  e) illuminating the sample using a second light source and acquiring an image of the region of interest of the sample, called the second image, using the second image sensor.

The second light source may be none other than the first light source. The first image sensor may lie in a detection plane. The relative movement of the sample may notably make it possible to automatically pass between:

a first mode, in which the sample is placed in a field of observation of the first image sensor, called the first field of observation, so as to acquire the first image;

a second mode, in which the sample is placed in the field of observation of the second image sensor, so as to acquire the second image.

According to one embodiment, in step c), the region of interest is selected, in the first image, using a manual selector, for example a computer mouse or a keyboard, or via an analysis, carried out on the first image, the analysis being based on a predefined selection criterion and implemented by a processor.

According to one embodiment, step c) comprises the following substeps:
  ci) applying a propagation operator to the first image, so as to calculate a complex expression for the exposure light wave on a reconstruction surface lying facing the detection plane, defining a complex image;
  cii) from the calculated complex image, forming an image, called the reconstructed image, depending on the modulus and/or phase of the complex expression;
  ciii) selecting the region of interest in the reconstructed image.

By "from the first image" what is meant is from the first image, or via an image obtained from the first image, for example after cropping or normalization or the application of a filter.

In substep ciii), the region of interest may be defined, in the reconstructed image, using a manual selector or via an analysis of the reconstructed image, the analysis being based on a predefined selection criterion and implemented by a processor.

In substep ci), the reconstruction surface may be a plane; it may in particular be a sample plane, in which the sample lies.

According to one embodiment, in step ci), the propagation operator is applied to an image, called the intermediate image, obtained by applying an operator to the first image, so that said image covers a field of observation similar to the first image, and comprises a number of pixels lower than the number of pixels of the first image. The method may then comprise the following substeps:
  civ) applying a propagation operator to the first image, in the region of interest selected in substep ciii), so as to calculate a complex expression for the exposure light wave on a reconstruction surface lying facing the detection plane, and notably in the sample plane, defining a complex image of interest;
  cv) from the calculated complex image of interest, forming an image, called the reconstructed image of interest, depending on the modulus and/or phase of the complex expression;
  cvi) displaying the reconstructed image of interest.

The number of pixels of the intermediate image may be at least 2 times, or even at least 10 times lower than the number of pixels of the first image.

According to one embodiment, the method comprises, prior to step c), a step of calibrating a position of the sample with respect to the detection plane, the calibrating step comprising the following substeps:
  i) selecting a plurality of calibration points in the acquired first image;
  ii) defining an elementary calibration region about each selected calibration point;
  iii) implementing, with a processor, a digital focusing algorithm, so as to estimate a distance, called the calibration distance, between the sample and the detection plane, for each elementary calibration region;

iv) partitioning the acquired first image into various elementary images, and associating, with each elementary image, a distance between the sample and the detection plane, depending on the calibration distance determined for each elementary calibration region;

such that:

substep ci) comprises applying a propagation operator to each elementary image, depending on the distance associated with said elementary image, so as to calculate, for each elementary image, a complex expression for the exposure light wave in an elementary reconstruction plane;

step cii) comprises forming an elementary reconstructed image from the modulus or phase of the complex expression calculated in substep ci), in each elementary reconstruction plane, the reconstructed image being obtained by concatenation of each elementary reconstructed image.

The reconstructed image may be used to select a region of interest of the sample. According to this embodiment, the digital focusing algorithm may comprise the following steps:

applying a numerical propagation operator to each elementary calibration region in order to obtain, for each thereof, a complex image, called the calibration image, of the exposure light wave in various reconstruction planes that are respectively spaced apart by various distances from the detection plane;

for each elementary calibration region, determining, for each reconstruction plane, an indicator of the clearness of an obtained reconstructed image depending on the phase and/or modulus of the complex calibration expression calculated in said reconstruction plane;

determining a calibration distance between the sample and the detection plane for each elementary calibration region, depending on the calculated clearness indicators.

According to one embodiment, the method may comprise, following step c), or in step d), the following substeps:

di) implementing, with a processor, a digital focusing algorithm, so as to estimate a distance between the sample and a detection plane in which the image sensor lies, in the region of interest selected in step c);

dii) moving the sample relative to the optical system, while taking into account the distance thus estimated, such that the sample is placed in a focal plane of the optical system.

The digital focusing algorithm may comprise:

applying a numerical propagation operator to the first image, so as to calculate a complex expression for the exposure light wave in a plurality of reconstruction planes respectively located at various reconstruction distances from the detection plane;

obtaining a reconstruction image at each reconstruction distance, from the phase or amplitude of the complex expression determined in each reconstruction plane;

determining an indicator of the clearness of each reconstruction image;

determining the distance between the sample and the detection plane, in the region of interest, depending on the clearness indicator determined for each reconstruction image.

The method may be implemented with a device such as described in this description.

Another subject of the invention is a method for observing a sample, comprising the following steps:

1) illuminating the sample using a first light source;

2) acquiring an image of the sample, called the first image, using a first image sensor, the sample being held between the first light source and the first image sensor, no magnifying optics being placed between the first image sensor and the sample;

3) obtaining an image, called the reconstructed image, of the sample, step c) comprising the following substeps:

applying a propagation operator to the first image, so as to calculate a complex expression for the exposure light wave on a reconstruction surface lying facing the detection plane, defining a complex image;

from the calculated complex image, forming the reconstructed image depending on the modulus and/or phase of the complex expression, and notably from the complex image obtained beforehand.

According to one embodiment, the method comprises, prior to step 3), a step of calibrating a position of the sample with respect to the detection plane, the calibrating step comprising the following substeps:

i) selecting a plurality of calibration points in the acquired first image;

ii) defining an elementary calibration region about each selected calibration point;

iii) implementing, with a processor, a digital focusing algorithm, so as to estimate a distance, called the calibration distance, between the sample and the detection plane, for each elementary calibration region;

iv) partitioning the first image into various elementary images, and associating, with each elementary image, a distance between the sample and the detection plane, depending on the calibration distance determined for each elementary calibration region;

such that:

step 3) comprises applying a propagation operator to each elementary image, depending on the distance associated with said elementary image, so as to calculate, for each elementary image, a complex expression for the exposure light wave in an elementary reconstruction plane;

step 3) also comprises forming an elementary reconstructed image from the modulus or phase of the complex expression that are thus calculated, in each elementary reconstruction plane, the reconstructed image being obtained by combination, for example concatenation, of each elementary reconstructed image.

The digital focusing algorithm may be such as described in this description.

Other advantages and features will become more clearly apparent from the following description of particular embodiments of the invention, which embodiments are given by way of nonlimiting example and shown in the figures listed below.

FIGURES

Figure 1B:
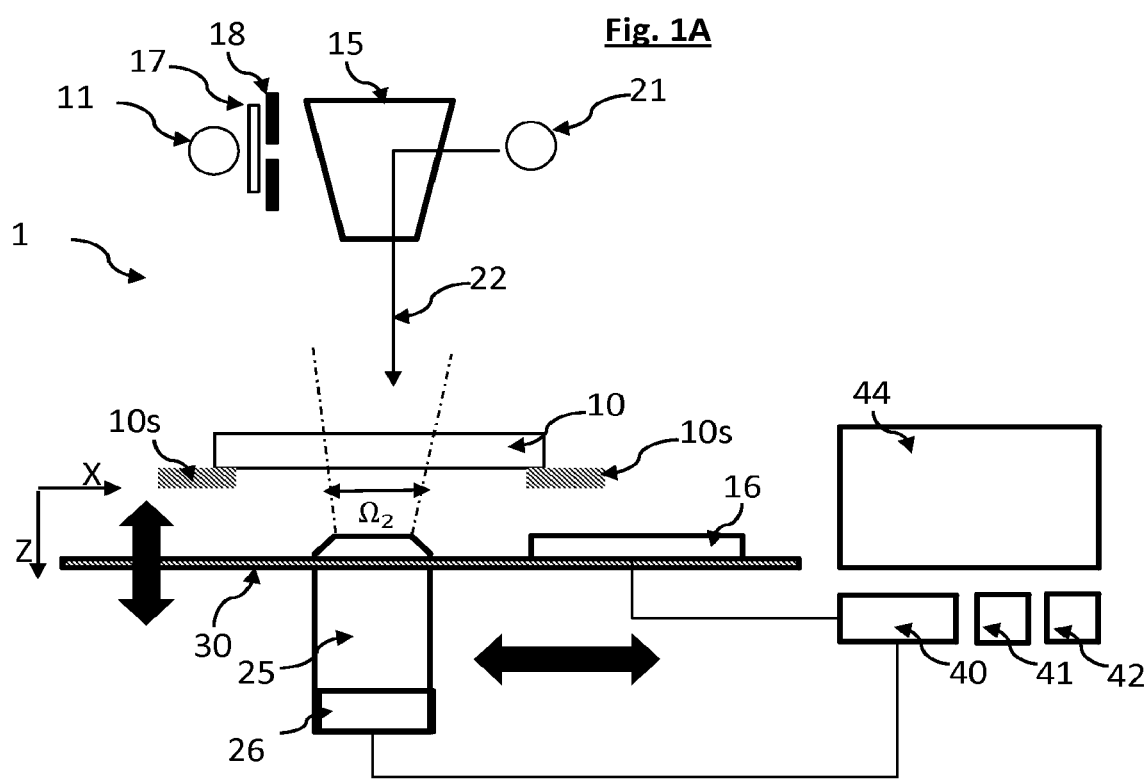

FIG. 1A shows one embodiment of a device according to the invention, which device is configured in a first sample-observation mode. FIG. 1B shows the device of FIG. 1A configured in a second sample-observation mode. FIG. 1C shows one example of a first light source, with which a device according to the invention is able to be equipped. FIG. 1D shows another embodiment of a device according to the invention. FIG. 1E shows a rotatable stage of a device according to the invention.

Figure 2A:
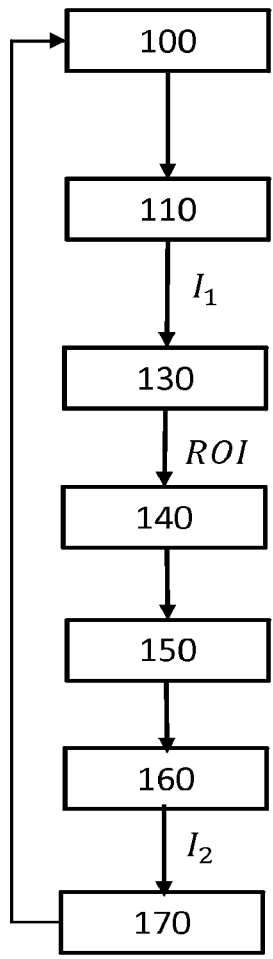
Figure 2B:
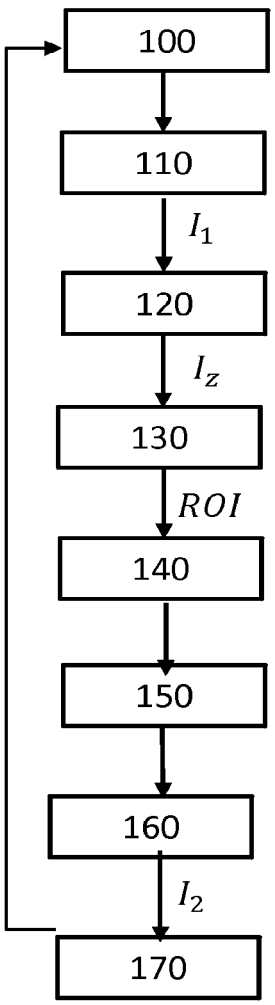
Figure 2C:
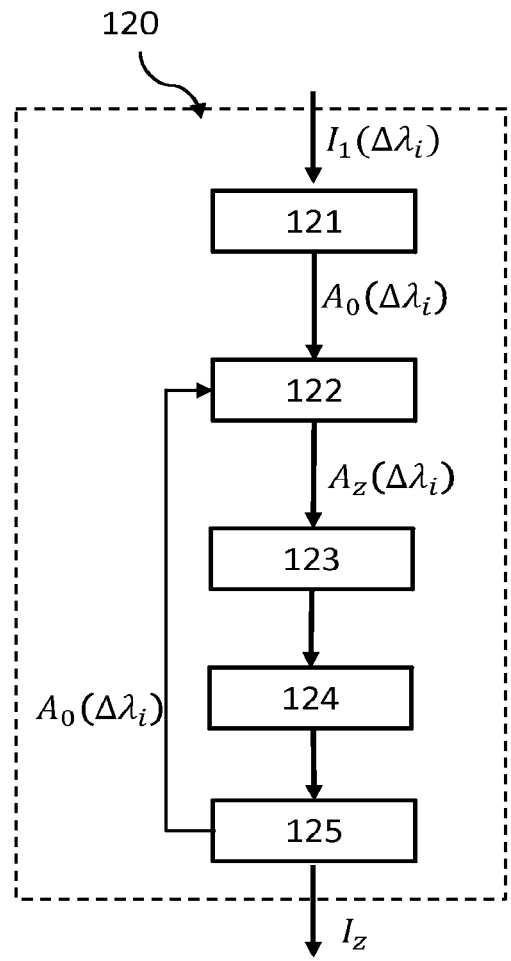
Figure 2D:
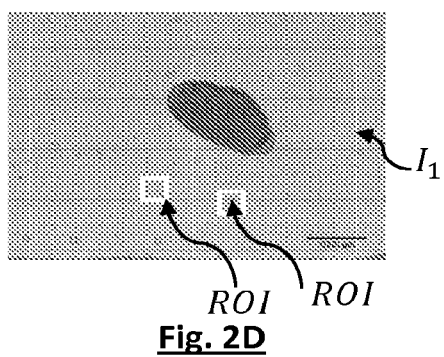
Figure 2E:
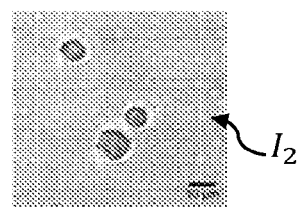
Figure 2F:
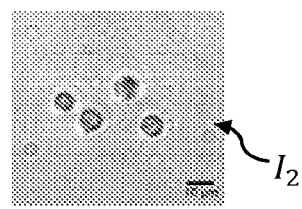

FIG. 2A shows the main steps of a method for observing a sample according to a first embodiment. FIG. 2B shows the main steps of a method for observing a sample according to a second embodiment. FIG. 2C shows the main steps of the step 120 described with reference to FIG. 2B. FIG. 2D is an image of a cell-containing sample, obtained in the first observation mode. FIGS. 2E and 2F are images, obtained in the second observation mode, of regions of interest selected in the image of FIG. 2D. FIG. 2G is an image of a sample, comprising a tissue slide, obtained in the first observation mode. FIG. 2H is an image obtained in the second observation mode, of a region of interest selected in the image of FIG. 2G.

FIG. 3A is an image of a sample, called the reconstruction image, obtained according to one variant of the first observation mode. FIGS. 3B and 3C are images, obtained according to the variant of the first observation mode, of regions of interest selected in the image of FIG. 3A. FIG. 3D schematically shows the main steps of the variant implemented to obtain images 3A to 3C.

Figure 4A:
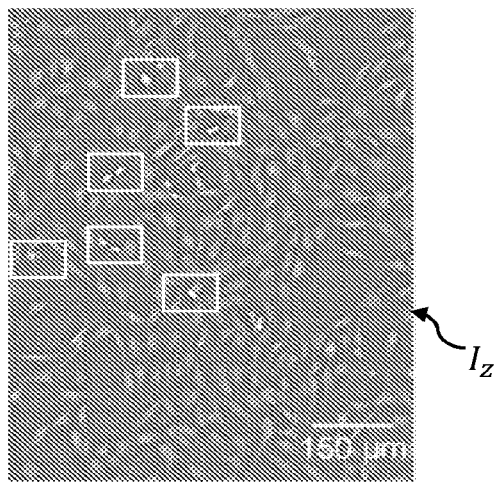
Figure 4B:
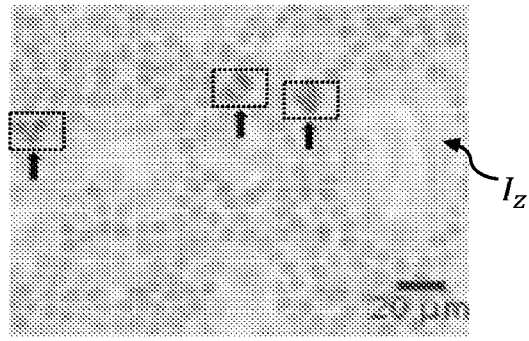
Figure 4C:
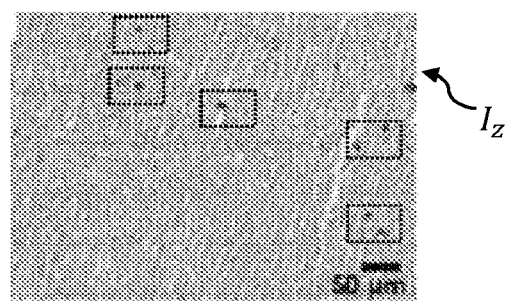

FIG. 4A is an image, called the reconstructed image, of a sample containing dividing cells, the latter being the subject of a region of interest, represented by a box of light color. FIG. 4B is an image, called the reconstructed image, of a sample containing white blood cells, the latter being the subject of a region of interest, represented by a box of dark color. FIG. 4C is an image, called the reconstructed image, of a sample containing infected cells, the latter being the subject of a region of interest, represented by a box of dark color.

Figure 5:
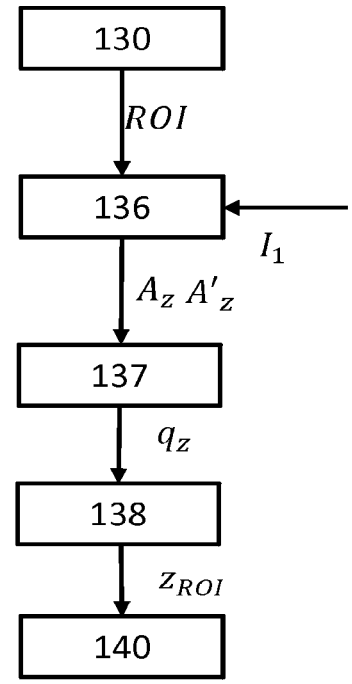

FIG. 5 shows the steps of one embodiment.

Figure 6A:
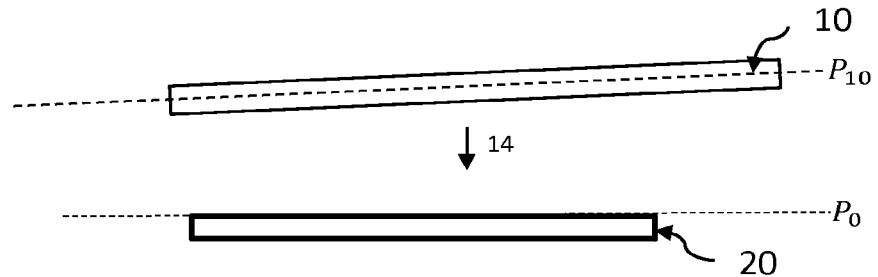
Figure 6B:
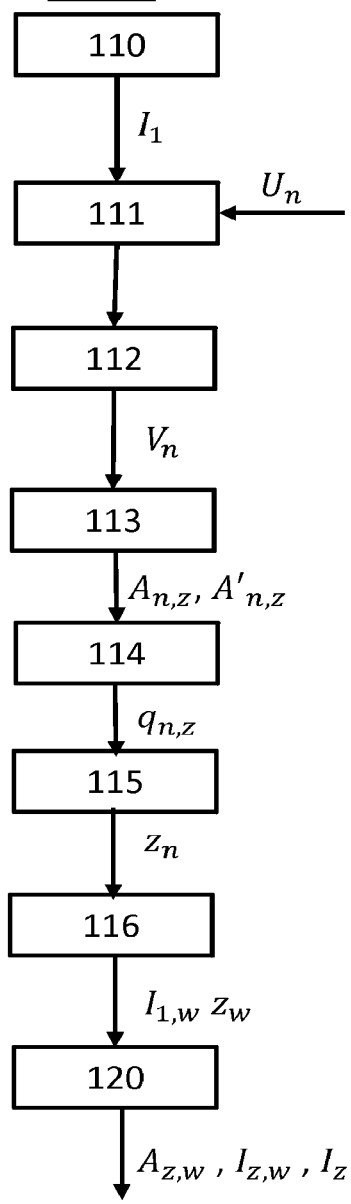
Figure 6C:
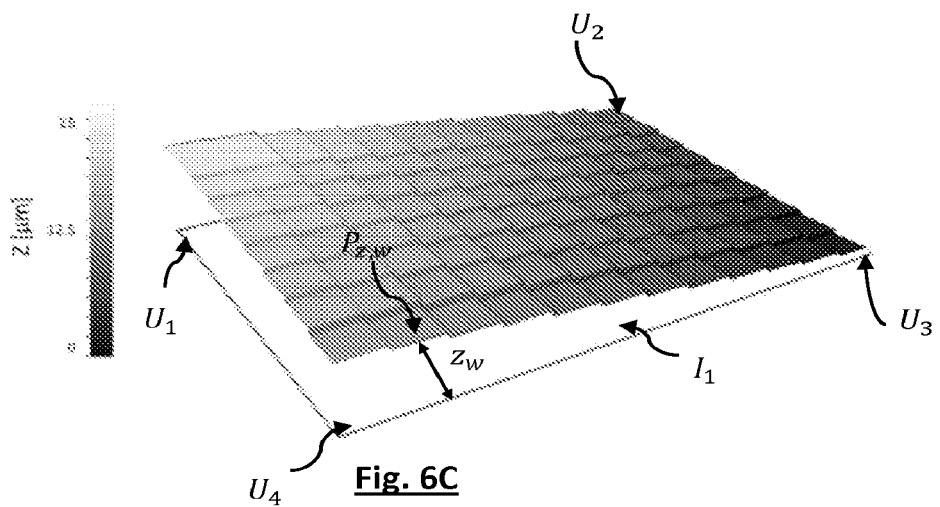
Figure 6D:
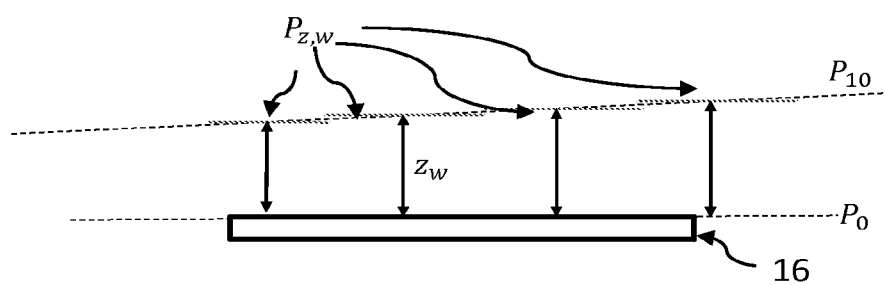

FIG. 6A shows a sample that is inclined with respect to an image sensor. FIG. 6B shows the main steps of a method allowing the inclination schematically shown in FIG. 6A to be taken into account, so as to obtain images, called reconstructed images, corrected for this inclination. FIGS. 6C and 6D illustrate the steps shown in FIG. 6B.

Figure 7A:
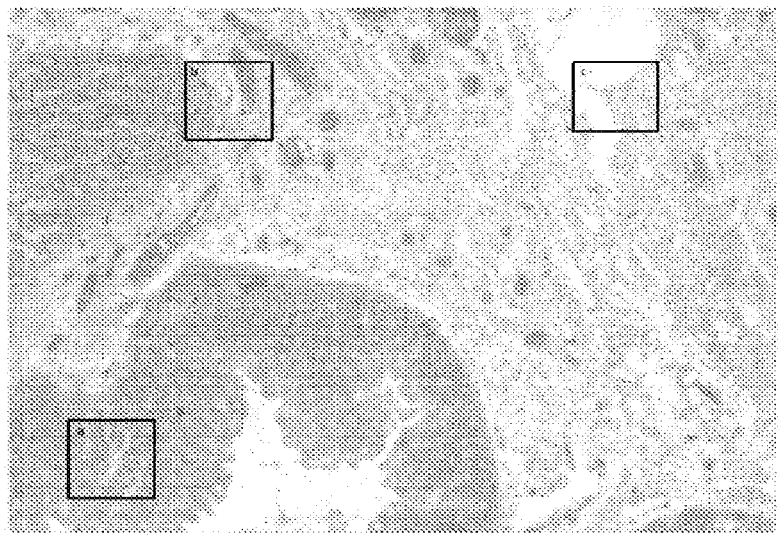
Figure 7B:
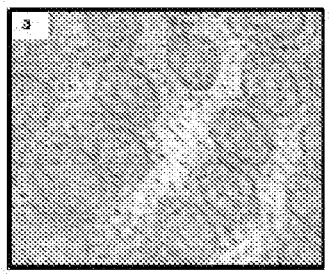
Figure 7C:
Figure 7D:
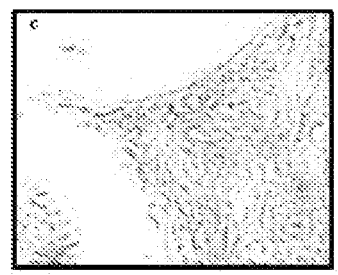
Figure 7E:
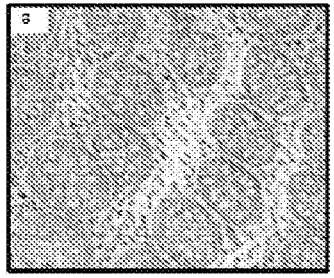
Figure 7F:
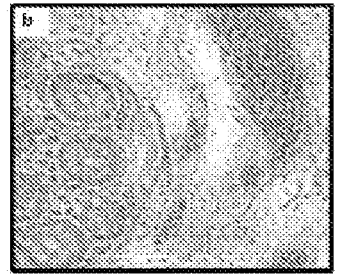
Figure 7G:

FIG. 7A is an image of the sample obtained in the first mode, the sample being inclined with respect to an image sensor. The images 7B, 7C and 7D are images reconstructed on the basis of FIG. 7A, without taking into account the inclination. FIGS. 7E, 7F and 7G are images reconstructed on the basis of FIG. 7A, with the inclination taken into account.

Figure 8:
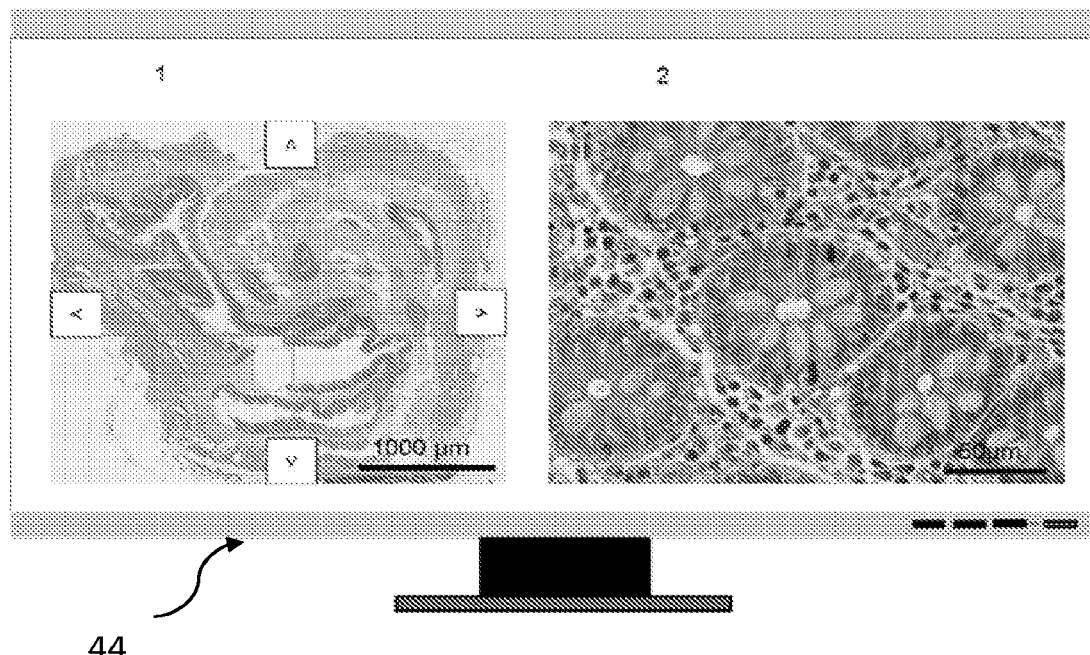

FIG. 8 shows a view of a screen of a device according to the invention.

DESCRIPTION OF PARTICULAR EMBODIMENTS

FIGS. 1A and 1B show one example of a bimodal microscopy device according to the invention. FIG. 1A shows the device in a lensless imaging mode, whereas FIG. 1B shows the device in a conventional microscopy mode. The device comprises a first light source 11, which is able to emit a first light wave 12 that propagates towards a sample 10, along a propagation axis Z, in an emission spectral band $\Delta\lambda$.

The sample 10 is placed on a sample holder 10s. The sample may be a medium, for example a liquid medium, in which particles are submerged, or on the surface of which particles are found. It may for example be a bodily or biological liquid. By particle, what is for example meant is objects the diameter of which is smaller than 1 mm, or even than 100 µm, or objects inscribable in a circle of such a diameter. The particles may be cells, microorganisms (for example bacteria or spores) or microbeads. The medium may also be agar, which is propitious for the development of bacterial colonies, or a solid. The sample 10 may also be a tissue slide intended for histological analysis, or a pathology slide comprising a small thickness of tissue deposited on a transparent slide. By small thickness, what is meant is a thickness that is preferably smaller than 100 µm, and preferably smaller than 10 µm, and typically a view microns. Such a tissue slide may be obtained using known preparation methods, a tissue sample being obtained via a biopsy or smear then prepared so as to take the form of a small thickness deposited on a transparent slide, the latter serving as holder. Such methods are well known in the histology field. They for example comprise slicing frozen tissue, or embedding a tissue sample into a paraffin matrix. The tissue may be stained, for example using a staining agent such as HES (hematoxylin eosin saffron).

Generally, the thickness of the sample 10, along the propagation axis Z, is preferably comprised between 20 µm and 500 µm. The sample lies in at least one plane $P_{10}$, called the sample plane, preferably perpendicular to the propagation axis Z. It is held on the holder 10s at a distance d from a first image sensor 16.

Preferably, the optical path traced by the first light wave 12 before reaching the sample 10 is longer than 5 cm. Advantageously, the light source, seen by the sample, may be considered to be point-like. This means that its diameter (or its diagonal) is preferably smaller than one tenth, better still one hundredth of the optical path between the sample and the light source. The light source 11 may, for example, be a light-emitting diode or a laser source, for example a laser source. It may be associated with a diaphragm 18, or a spatial filter. The aperture of the diaphragm 18 is typically comprised between 5 µm and 1 mm, and preferably between 50 µm and 500 µm. In this example, the diaphragm is that sold by Thorlabs under the reference P150S and its diameter is 150 µm. The diaphragm may be replaced by an optical fiber, a first end of which is placed facing the first light source 11 and a second end of which is placed facing the sample 10.

The device may comprise a diffuser 17, placed between the light source 11 and the diaphragm 18. Use of such a diffuser allows constraints on the centeredness of the light source 11 with respect to the aperture of the diaphragm 18 to be relaxed. The function of such a diffuser is to distribute the light beam, produced by the light source, into a cone of angle α. Preferably, the scattering angle α varies between 10° and 80°. The presence of such a diffuser makes it possible to make the device more tolerant to an off-centeredness of the light source with respect to the diaphragm. The diaphragm is not essential, in particular when the light source is sufficiently point-like, and notably when it is a laser source.

Preferably, the emission spectral band $\Delta\lambda$ of the incident light wave 12 has a width smaller than 100 nm. By spectral bandwidth, what is meant is a fullwidth at half maximum of said spectral band.

The device, such as shown in FIG. 1A, comprises a prism 15, able to reflect the first incident light wave 12 towards the sample 10. Use of such a prism allows the light sources to be kept immobile with respect to the sample. Such a prism is optional.

The first image sensor 16 is able to form a first image $I_1$ in a detection plane $P_0$. In the shown example, it is a question of an image sensor comprising a matrix array of pixels, of CCD or CMOS type, and the area of which is generally larger than 10 mm². The so-called detection area of the matrix array of pixels depends on the number of pixels and on their size. It is generally comprised between 10 mm² and 50 mm². The detection plane $P_0$ preferably lies perpendicular to the propagation axis Z of the incident light wave 12. The distance d between the sample 10 and the matrix array of pixels of the image sensor 16 is preferably comprised between 50 µm and 2 cm, and preferably comprised between 100 µm and 2 mm.

The absence of magnifying optics between the first image sensor 16 and the sample 10 will be noted. This does not prevent focusing micro-lenses optionally being present level with each pixel of the first image sensor 16, the function of these micro-lenses not being to magnifying the image acquired by the first image sensor.

Because of the proximity between the first image sensor 16 and the sample 10, the first image $I_1$ is acquired in a first field of observation $\Omega_1$ that is slightly smaller than the area of the image sensor, i.e. typically comprised between 10 mm² and 50 mm². This field of observation is large in comparison to the field of observation of a high-magnification microscope objectives, for example an objective of magnification higher than 10. Thus, the first image $I_1$ allows exploitable information on the sample to be obtained in a first large field of observation $\Omega_1$. An important element of the invention is to take advantage of this large field of observation to select a region of interest ROI of the sample in the first image $I_1$, then to analyse the selected region of interest with a conventional microscope objective 25 having a magnification higher than 1, or even higher than 10.

Under the effect of the first incident light wave 12, the sample may generate a diffracted wave 13 that is liable to interfere, in the detection plane $P_0$, with that portion of the incident first light wave 12 which is transmitted by the sample. Thus, the light wave 14 (called the exposure light wave) transmitted by the sample 10 and to which the first image sensor 16 is exposed, may comprise:
  a component 13 resulting from diffraction of the first incident light wave 12 by the sample;
  a component 12', transmitted by the sample, and resulting from absorption of the first incident light wave 12 by the sample.

These components interfere in the detection plane. Thus, the first image $I_1$ acquired by the image sensor comprises interference patterns (or diffraction patterns), each interference pattern being generated by the sample. For example, when the sample contains particles, it is possible to associate, with each particle, one interference pattern. The first image $I_1$ then allows the particles to be located and counted, or even a particle to be identified on the basis of the morphology of the diffraction pattern that is associated therewith, as described for example in WO2008090330. It is then possible to select a region of interest in the first image $I_1$, then to carry out a more thorough analysis of the region of interest using the second mode described below, with reference to FIG. 1B.

A processor 40, for example a microprocessor, is configured to process each image $I_1$ acquired by the image sensor 16, and to for example allow the region of interest ROI to be selected and any of the holographic reconstruction or image-processing operations described in this patent application to be carried out. In particular, the processor is a microprocessor connected to a programmable memory 42 in which a sequence of instructions for carrying out the image-processing operations and calculations described in this description is stored. The processor may be coupled to a display 44 allowing images acquired by the image sensor 16 or calculated by the processor 40 to be displayed.

As described above, the first image $I_1$ may suffice to locate a region of interest ROI, which it seems judicious to analyse more thoroughly. This is for example the case when the sample 10 contains particles, the latter possibly being subjected to a more detailed analysis implementing the second mode described below.

The device shown in FIG. 1A comprises a second light source 21, and an optical system 25 that has a magnification higher than 1. The second light source 21 emits a second incident light wave 22 that propagates to the sample. A second image sensor 26 is coupled to the optical system 25, the second sensor 26 being placed in the image focal plane of the magnifying optical system 25. The second sensor 26 allows detailed information to be obtained on the selected region of interest ROI of the sample, in a second field of observation $\Omega_2$ that is smaller than the first field of observation $\Omega_1$. The first light source 11 and the second light source 21 may be placed facing the sample 10, in which case the prism 15 is not required.

The sample may be moved relative to the first image sensor 16 into the optical system 25, so as to be placed:
  either in a first large-field observation mode using the first image sensor 16, as described above, this first mode being shown in FIG. 1A;
  or in a second magnified observation mode using the second image sensor 26. In this second mode, the sample is placed in the object focal plane of the optical system 25. In other words, in the second mode, the sample is placed, with respect to the second image sensor 26, so that the latter is able to acquire a clear second image $I_2$ of the sample 10, through the optical system 25. The second mode is shown in FIG. 1B.

Preferably, the sample 10 is kept immobile, whereas the image sensor 16 and the optical system 25 are moved with respect to the sample to switch between the two observation modes. FIGS. 1A and 1B show a movable stage 30 holding the first image sensor 16 and the optical system 25, and allowing them to be moved with respect to the sample 10. Alternatively, the sample is mounted on a movable holder 10s allowing it to be moved either to facing the first image sensor 16, or to facing the optical system 25. As illustrated in FIG. 1B, the movable stage may be able to allow a movement parallel to the propagation axis Z of the light, or in the XY plane perpendicular to this axis. The processor 40 may control the movable stage 30, so as to define, in each mode, a relative position of the sample 10 with respect to the first image sensor 16 or with respect to the optical system 25.

The optical system 25 is in particular a microscope objective, the magnification of which is preferably higher than or equal to 5 or even than 10. The device may comprise a plurality of optical systems 25, 25' of different magnifications. In the second mode, the sample is illuminated by the second light source 21, for example a white light source. The second light source 21 is not necessarily different from the first light source 11. The second image $I_2$, which is acquired by the second image sensor, through the objective 25, allows a detailed representation of the region of interest ROI identified in the first image $I_1$ to be obtained.

Preferably, the relative movement of the first image sensor 16 and of the optical system 25 is automatically calculated by the processor 40, depending on the region of interest ROI of the sample selected by an operator in the first image $I_1$. For example, the first image $I_1$ may be displayed on the display 44. The operator then selects the region of interest ROI using a selector 41, the latter notably being a peripheral accessory of the processor 40, such as a computer mouse or a keyboard. The selection of the region of interest results in the stage 30 being actuated to place the sample in the second analysis mode, i.e. facing the objective 25. The selector allows a manual selection of the region of interest ROI of the sample, but an automatic selection may be carried out by a processor, for example the processor 40, as described below with reference to FIGS. 4A to 4C.

It will be understood that the combination of these two modes allows time to be saved during the analysis of the sample, by allowing fine analysis, carried out with the objective 25, to be concentrated on a limited number of regions of interest, the latter being determined using the large-field image $I_1$ acquired in the first mode. A needless and time-consuming scan of the entire area of a sample using a microscope objective is thus avoided.

FIG. 1C shows one embodiment in which the first light source 11 comprises three elementary light sources $11_1$, $11_2$ and $11_3$, emitting in a first spectral band $\Delta\lambda_1$=450 nm-465 nm, a second spectral band $\Delta\lambda_2$=520 nm-535 nm and a third spectral band $\Delta\lambda_3$=620 nm-630 nm, respectively. These three elementary light sources are here light-emitting diodes. In this example, the light source is the light-emitting diode sold by CREE under the reference Xlamp MCE. The three constituent elementary light-emitting diodes thereof $11_1$, $11_2$ and $11_3$ are activated simultaneously. Alternatively, these light-emitting diodes may be activated successively. With such a light source, the diffuser 17 is particularly useful, because it permits a certain off-centeredness of the one or more elementary light sources.

The first image sensor 16 may comprise a Bayer filter, such that each pixel is sensitive to one spectral band chosen from the blue, the red or the green. Thus, when the sample 10 is exposed to such a first light source 11, the first image sensor 16 acquires a first image $I_1$ that is able to be decomposed into:
- a first image $I_1(\Delta\lambda_1)$ in the first emission spectral band $\Delta\lambda_1$ of the first light-emitting diode $11_1$, this image being formed from pixels exposed to a wavelength transmitted by the blue filter of the Bayer filter;
- a first image $I_1(\Delta\lambda_2)$ in the second emission spectral band $\Delta\lambda_2$ of the second light-emitting diode $11_2$, this image being formed from pixels exposed to a wavelength transmitted by the green filter of the Bayer filter;
- a first image $I_1(\Delta\lambda_3)$ in the third emission spectral band $\Delta\lambda_3$ of the third light-emitting diode $11_3$, this image being formed from pixels exposed to a wavelength transmitted by the red filter of the Bayer filter.

Generally, in this embodiment, the first image sensor 16 allows first images $I_1(\Delta\lambda_i)$ of the sample 10 to be acquired in various spectral bands $\Delta\lambda_i$. Each first image $I_1(\Delta\lambda_i)$ is representative of a light wave 141 to which the first image sensor 16 is exposed in each spectral band $\Delta\lambda_i$. Preferably, there is no overlap between the various spectral bands; a negligible overlap, for example concerning less than 25% and better still less than 10% of the emitted light intensity, is however envisionable.

Other configurations are possible, for example it is possible to use a monochrome image sensor that acquires first images $I_1(\Delta\lambda_i)$ of the sample when the latter is successively illuminated, by an incident wave 121, in various spectral bands $\Delta\lambda_i$. Each incident wave 121 may be emitted by a light source 11i that emits one of said spectral bands, or by a white light source that is filtered by an optical filter the passband of which corresponds to said spectral band $\Delta\lambda_i$.

FIG. 1D shows one embodiment in which the first source 11 is a laser source, for example a laser diode. In such a configuration, the diffuser 17 and the spatial filter 18 are not necessary.

FIG. 1E shows one embodiment in which the stage 30 takes the form of a turret, to which a first image sensor 16, held by a sensor holder 16s, and two objectives 25, 25' having different magnifications, are fastened. The turret is able to turn so as to place the first sensor 16 or one of the objectives facing the sample 10.

FIG. 2A shows the main steps of a method for observing a sample such as described above. These steps are:

Step 100: illuminating the sample 10 using the first light source 11, the sample being placed facing the first image sensor 16.

Step 110: acquiring a first image $I_1$ of the sample 10 using the first image sensor 16.

Step 130: selecting, manually or automatically, a region of interest ROI in the first image $I_1$.

Step 140: moving the sample 10 relative to the objective 25, so as to place the region of interest ROI of the sample 10 facing this objective.

Step 150: Illuminating the sample 10 using the second light source 21.

Step 160: acquiring a second image $I_2$ representing the region of interest ROI using the second images sensor 26, through the objective 25.

Step 170: exiting from the algorithm or moving the sample relative to the first image sensor 16 so as to place the sample facing the first image sensor 16.

When the number of diffracting elements of the sample increases, the first image $I_1$ acquired by the first image sensor 16 may not allow the region of interest to be reliably selected. This may be the case when the sample contains particles and the concentration of the particles is high. This is also the case when the sample is a thin tissue slide such as described above. In this case, the region of interest is not selected in the first image $I_1$, but in an image $I_z$ that is said to be reconstructed from the first image. Such an embodiment is shown in FIG. 2B. Steps 100, 110, 140, 150, 160 and 170 are identical to those described with reference to FIG. 2A. The method comprises the following steps:

Step 120: determining an image $I_z$, called the reconstructed image, that is representative of the sample. This image is obtained by applying a holographic propagation operator h, such as described below, to the first image $I_1$, so as to calculate a complex image $A_z$ representing the complex amplitude of the exposure light wave 14 on a surface lying substantially parallel to the detection plane $P_0$, at a distance z, called the reconstruction distance, from the latter. The reconstructed image $I_z$ is obtained from the modulus and/or phase of the complex amplitude $A_z$ thus calculated. By substantially parallel, what is meant is parallel, an angular tolerance of plus or minus 10° or 20° being acceptable.

Step 130: selecting, manually or automatically, a region of interest ROI in the reconstructed image $I_z$.

In this description, the term "reconstructed image" designates an image $I_z$ formed from the modulus or phase of the exposure light wave 14 on a reconstruction surface parallel to the detection plane. The reconstructed image is determined from the modulus or phase of the complex image $A_z$. This surface may be a plane $P_z$, located at a reconstruction distance z from the detection plane $P_0$. It may also be a question of a plurality of planes that lie parallel to the detection plane, and that are located at various distances $z_w$ from the detection plane, so as to take into account an inclination of the plane $P_{10}$ in which the sample 10 lies with respect to the detection plane $P_0$.

The reconstructed image $I_z$ is obtained by applying a holographic propagation operator h to the first image $I_1$ acquired by the first image sensor 16. Such a method, designated by the term holographic reconstruction, in particular allows an image of the modulus or phase of the exposure light wave 14 in a reconstruction plane $P_z$ parallel to the detection plane $P_0$, and in particular in the plane $P_{10}$ in which the sample lies, to be reconstructed. To do this, the first image $I_1$ is convoluted with a propagation operator h. It is then possible to reconstruct a complex expression A for the light wave 14 at every point of spatial coordinates (x, y, z), and in particular in a reconstruction plane Pz located at a reconstruction distance Izi from the image sensor 16, called the reconstruction distance, this reconstruction plane preferably being the sample plane $P_{10}$, with: $A(x,y,z)=I_1(x,y,z)*h$, * designating the convolution operator. In the rest of this description, the coordinates (x,y) designate a radial position in a plane perpendicular to the propagation axis Z. The coordinate z designates a coordinate along the propagation axis Z. The complex expression A is a complex quantity the argument and the modulus of which are respectively representative of the phase and intensity of the exposure light wave 14. The convolution of the first image $I_1$ with the propagation operator h allows a complex image $A_z$ to be obtained that represents a spatial distribution of the complex expression A in a reconstruction plane $P_z$ lying at a coordinate z from the detection plane $P_0$. In this example, the equation of the detection plane $P_0$ is z=0. The complex image $A_z$ corresponds to a complex image of the exposure wave 14 in the reconstruction plane $P_z$. It also represents a two-dimensional spatial distribution of the optical properties of the exposure wave 14.

The function of the propagation operator h is to describe the propagation of light between the image sensor 16 and a point of coordinates (x,y,z), located at a distance |z| from the first image sensor. It is then possible to determine the modulus M(x,y,z) and/or phase $\varphi$ (x,y,z) of the light wave 14, at this distance |z|, which is called the reconstruction distance, with:

$$M(x,y,z) = \text{abs}[A(x,y,z)];$$

$$\varphi(x,y,z) = \arg[A(x,y,z)];$$

The operators abs and arg designate the modulus and argument, respectively.

The propagation operator is for example the Fresnel-Helmholtz function, such that:

$$h(x, y, z) = \frac{1}{j\lambda z}e^{j2\pi \frac{z}{\lambda}} \exp\left(j\pi \frac{x^2 + y^2}{\lambda z}\right).$$

In other words, the complex expression for the light wave 14, at every point of spatial coordinates (x, y, z), is such that $A(x, y, z) = M(x, y, z)e^{j\varphi(x,y,z)}$. It is possible to form images, called reconstructed images, $M_z$ and $\varphi_z$ respectively representing the modulus and phase of the complex expression A in a plane $P_z$ located at a distance |z| from the detection plane $P_0$, with $M_z=\text{mod}(A_z)$ and $\varphi_z=\arg(A_z)$.

However, simply applying the propagation operator h to the first image generally leads to a complex image $A_z$ that is affected by substantial reconstruction noise. This is due to the fact that the first image $I_1$, acquired by the image sensor 16, contains no information on the phase of the exposure light wave 14. It is possible to implement interactive algorithms, so as to gradually estimate the phase of the exposure light wave 14 in the detection plane $P_0$, this then allowing a more exact complex image $A_z$ of the light wave 14 in a reconstruction plane $P_z$ to be obtained.

The inventors have developed an iterative algorithm, which is described in the publication S. N. A. Morel, A. Delon, P. Blandin, T. Bordy, O. Cioni, L. Hervé, C. Fromentin, J. Dinten, and C. Allier, "Wide-Field Lensfree Imaging of Tissue Slides," in *Advanced Microscopy Techniques IV; and Neurophotonics II*, E. Beaurepaire, P. So, F. Pavone, and E. Hillman, eds., Vol. 9536 of SPIE Proceedings (Optical Society of America, 2015) and in patent application FR1554811 filed 28 May 2015, and more precisely in steps 100 to 500 described in this patent application. In this algorithm, the sample is successively or simultaneously illuminated in various spectral bands $\Delta\lambda_i$, using a light source 11 such as illustrated in FIG. 1C. In the detection plane $P_0$, a first image $I_1(\Delta\lambda_i)$ is acquired in each spectral band. The algorithm allows a complex image $A_z(\Delta\lambda_i)$ of the light wave 14 to be obtained in a reconstruction plane $P_z$, in each spectral band $\Delta\lambda_i$. The complex images $A_z(\Delta\lambda_i)$ thus obtained, in each spectral band $\Delta\lambda_i$, may be combined, for example by calculating an average, in each pixel, of their modulus and their phase, this allowing a complex image $A_z$ to be formed. Alternatively, the reconstructed image $A_z$ is obtained from the modulus or phase of a complex image $A_z(\Delta\lambda_i)$ in one of the spectral bands $\Delta\lambda_i$. The main steps of this algorithm are shown in FIG. 2C.

Step 121: initialization, from the first image $I_1(\Delta\lambda_i)$ acquired by the image sensor 16 in each spectral band $\Delta\lambda_i$. This corresponds to step 100 described in the aforementioned patent application FR1554811. This initialization allows an initial complex image $A_0(\Delta\lambda_i)$ representative of the exposure light wave 14 in the detection plane $P_0$, in each spectral band $\Delta\lambda_i$, to be obtained.

Step 122: propagation of each first image $I_{1i}(\Delta\lambda_i)$ to a propagation plane $P_z$ located at a reconstruction distance z from the detection plane $P_0$. This corresponds to step 200 described in patent application FR1554811. A complex image $A_z(\Delta\lambda_i)$ representing the exposure wave 14, in the reconstruction plane $P_z$, and in each spectral band $\Delta\lambda_i$, is then obtained. The reconstruction plane is preferably the plane $P_{10}$ of the sample.

Step 123: combination of each complex image $A_z(\Delta\lambda_i)$ so as to obtain a weighting function in the reconstruction plane P. This corresponds to step 300 described in patent application FR1554811. The weighting function may be a weighted sum of each complex image $A_z(\Delta\lambda_i)$.

Step 124: propagation of the weighting function to the detection plane $P_0$, by application of the propagation operator h to the weighting function. This corresponds to step 400 described in patent application FR1554811.

Step 125: update of the complex image $A_0(\Delta\lambda_i)$ representative of the exposure light wave 14 in the detection plane $P_0$, in each spectral band $\Delta\lambda_i$. This update is carried out on the basis of the weighting function propagated to the detection plane $P_0$ in the preceding step. The phase of the complex image $A_0(\Delta\lambda_i)$, in each spectral band $\Delta\lambda_i$, is updated by being replaced by the phase of the weighting function propagated to the detection plane $P_0$. This corresponds to step 500 described in patent application FR1554811.

Each complex image thus updated in the detection plane is then propagated to the reconstruction plane, in step 122. Steps 122 to 125 are implemented iteratively until the phase of the complex image in the detection plane $P_0$ or in the sample plane $P_{10}$ is considered to be correctly estimated.

From the complex image $A_z(\Delta\lambda_i)$ obtained, in the reconstruction plane $P_z$, in each spectral band $\Delta\lambda_i$, it is possible to obtain a reconstructed image $I_z$, for example:

by averaging a modulus or phase of the complex image $A_z(\Delta\lambda_i)$ in each spectral band $\Delta\lambda_i$: the reconstructed image $I_z$ is then a grayscale image;

by combining the modulus and/or phase of the complex image $A_z(\Delta\lambda_i)$ in each spectral band $\Delta\lambda_i$, this allowing a colour reconstructed image $I_z$ representing the modulus or phase to be obtained.

Other algorithms are usable to obtain a complex image representing the exposure wave 14, on a reconstruction surface P facing the first image sensor 16. Such algorithms are for example described in patent application FR1652500, which was filed 23 Mar. 2016. Such algorithms may be implemented on the basis of a first light source 11 that emits a first light wave 12 in a single spectral band, without departing from the scope of the invention.

FIG. 2D shows an image reconstructed implementing the algorithm described with reference to FIG. 2C. It shows a spatial distribution of the modulus of a sample composed of Jurkat cells floating in a phosphate-buffered-saline (PBS) liquid buffer. A spot of ink was produced, so as to form a visual marker. It will be noted that this reconstructed image allows the sample to be observed in a large field of observation and with an acceptable precision. It makes it possible to easily select a region of interest ROI in the sample. FIGS. 2E and 2F show observations of each region of interest using a magnifying objective 25, in the second observation mode.

The experimental conditions of this trial were the following:

light source 11: CREE Xlamp MCE;
first image sensor: monochrome IDS MT9J003, 3840*2748 pixels, each pixel having a side length of 1.67 mm, i.e. a detection area of 6.4*4.6 mm (29.4 mm$^2$);
distance d between the sample 10 and the first image sensor 16: 1.5 mm;
spatial filter: 150 µm aperture;
objective 25: Olympus—magnification 20;
second image sensor 26: Mightex SE-C050-U—color sensor comprising 2560*1920 pixels.

According to one embodiment, the region of interest ROI selected in the first image $I_1$ is the subject of a reconstruction, so as to obtain a reconstructed image that is representative of the light wave 14, only from the region of interest.

FIG. 2G is an image showing a tissue slide stained with an HES stain, the tissue being obtained from a mouse. The image of FIG. 2G is a reconstructed image $I_z$ showing the modulus of a complex amplitude reconstructed using the algorithm described with reference to FIG. 2C, in the plane of the tissue slide (sample plane). FIG. 2H shows a region of interest of this slide (identified in the reconstructed image $I_z$ and represented by a black frame in the image 2G) observed using an objective of 20× magnification.

According to one variant, a reconstructed image $I_z$ is obtained from a first image referred to as an intermediate image $I'_1$, which is obtained by applying binning to the first image $I_1$. Carrying out a reconstruction on an intermediate image $I'_1$ allows calculation time to be decreased, and a reconstructed image $I_z$ to be obtained more rapidly. In this reconstructed image, a region of interest ROI is selected. It is then possible to obtain a reconstructed image of interest $I_{z,ROI}$, limited to the region of interest selected beforehand. This reconstructed image of interest is obtained by applying holographic reconstruction algorithms, such as described or mentioned above, not to the entirety of the first image $I_1$, but only to the portion of the first image $I_{1,ROI}$ corresponding to the selected region of interest. FIGS. 3A, 3B and 3C correspond to such an embodiment. FIG. 3A shows an image reconstructed considering an intermediate image $I'_1$ obtained by applying 4*4 binning to the image $I_1$ acquired by the first image sensor 16. A reconstructed image $I_z$ of lesser quality than that shown in FIG. 2D is then obtained, but it is of sufficient quality to allow regions of interest ROI to be selected. When the operator selects a region of interest ROI, the selected region of interest is the subject of a reconstruction that is based only on the portion of the acquired image $I_1$ delineated by the region of interest. Thus, a preciser reconstructed image of interest $I_{z,ROI}$ is obtained, the small size of the region of interest ROI permitting use to be made of a reconstruction based on a portion $I_{1,ROI}$ of the first image $I_1$ of high spatial resolution. FIGS. 3B and 3C show reconstructed images of interest corresponding to the regions of interest indicated in FIG. 3A.

FIG. 3D illustrates the main steps of this variant. Step 110 corresponds to the acquisition of the first image $I_1$ by the first image sensor. Step 119 is the application of an operator, for example a binning operator, so as to obtain an intermediate image $I'_1$ that covers a field of observation similar to the first image, but that contains a smaller number of pixels than the number of pixels of the first image $I_1$. Preferably, the intermediate image $I'_1$ contains at least two times fewer pixels than the first image $I_1$, or even at least 4 times or 10 times fewer pixels than the first image $I_1$.

Step 120 corresponds to the reconstruction of the complex expression for the exposure light wave 14, in a reconstruction plane $P_z$, not from the first image $I_1$, but from the intermediate image $I'_1$. Thus a complex image $A_z$ is obtained from which is extracted the reconstructed image $I_z$, in the reconstruction plane $P_z$ from the modulus and/or phase of the complex image $A_z$.

Step 130 is the selection of a region of interest ROI, in the reconstructed image $I_z$.

Step 132 corresponds to selection of a portion $I_{1,ROI}$ of the first image corresponding to the region of interest ROI selected in the preceding step.

Step 134 is a reconstruction of the complex expression for the exposure light wave 14, in a reconstruction plane $P_z$, from the portion $I_{1,ROI}$ of the first image $I_1$ corresponding to the region of interest ROI selected in step 130. A reconstructed image of interest $I_{z,ROI}$ is thus obtained in the plane of reconstruction $P_z$, from the modulus and/or phase of the complex image, which image is called the complex image of interest $A_{z,ROI}$ reconstructed in the region of interest.

Steps 140 to 170, such as described above, may then be implemented, so as to obtain an image of the region of interest selected in step 130 through the objective 25, using the second image sensor 26. However, in certain cases, the reconstructed image of interest may be sufficient to obtain a correct representation of the sample 10.

According to one embodiment, the region of interest ROI of the sample is not selected manually, using a selector 41 such as a mouse or keyboard, but automatically, via implementation of an image-processing algorithm, using a processor, for example the processor 40. The region of interest is selected depending on a predefined selection criterion. This criterion is for example a morphological criterion, in which case a region of interest is automatically detected in case of correspondence with the morphological criterion. FIG. 4A shows a so-called reconstructed phase image $I_z$, representing the phase of the complex amplitude of the exposure light wave in a reconstruction plane, the latter coinciding with the sample plane. The sample consists, in this example, of cells certain of which are dividing. The inventors have observed that cellular division results in an abrupt increase in phase. It is thus possible to automatically detect, in the reconstructed image $I_z$, pixels the intensity of which exceed a certain threshold, and to define a region of interest around such pixels. Simple intensity thresholding of the phase image is enough to automatically locate the regions of interest. Each region of interest may then be observed successively in more detail, in particular using the second mode. In FIG. 4A, the regions of interest have been indicated by a white frame.

FIG. 4B shows an image of a blood film stained with Giemsa, in which white blood cells are sought. It is a reconstructed image $I_z$ representing the phase of the complex amplitude of the exposure light wave 14, in the sample plane. In such a situation, regions of interest containing a particle of interest, in the present case a white blood cell, are sought. The regions of interest are identified via a morphological analysis based on a grayscale and size criterion, white blood cells appearing in the form of spots of uniform and dark grayscale, of a preset size. Using such a criterion of interest, regions of interest may be automatically detected, the latter each being indicated by a dotted black frame.

FIG. 4C shows infected cells of a tissue. An immunohistochemical staining agent specific to the Epstein-Barr virus (or EBV) was applied beforehand. Cells infected with EBV appear as dark spots in the image of FIG. 4C. It is a reconstructed image $I_z$ representing the modulus of the complex amplitude of the exposure light wave, in the sample plane. In such an image, infected cells appear as dark spots, that it is easy to identify via thresholding. Using such a criterion of interest, regions of interest may be automatically detected, the latter each being indicated by a dotted black frame.

Moreover, as described with reference to the prior art, the first image $I_1$, or the image $I_z$ reconstructed from the first image, may be used to track moving particles. Each particle may be associated with a region of interest, the latter being able to be periodically analyzed using the second mode.

According to one embodiment, illustrated in FIG. 5, the first image $I_1$ is also used to determine the distance between the sample 10 and the first image sensor 16 (or the detection plane $P_0$), level with the region of interest ROI. To do this, a processor, for example the processor 40, implements a digital focusing algorithm. Such an algorithm is known to those skilled in the art. The main steps are described with reference to FIG. 5.

Step 136: The first image $I_1$, or a portion of the first image corresponding to the region of interest ROI, is propagated using a numerical propagation operator h, such as described above, to a plurality of reconstruction planes $P_z$, each reconstruction plane lying at a different distance z from the detection plane $P_{10}$. A complex expression is then obtained for the light wave 14 in these various reconstruction planes $P_z$, thus forming the same number of complex images $A_z$. A stack of complex images is thus obtained. From each complex image $A_z$, a reconstruction image $A'_z$ representing the modulus and/or phase of the complex expression in each reconstruction plane $P_z$ in question is established.

Step 137: A clearness indicator $q_z$ is assigned to each reconstruction image $A'_z$. The clearness indicator $q_z$ may be an indicator that quantifies a dispersion of each image $A'_z$, for example a standard deviation or a variance. It may also be defined by convoluting each reconstruction image with a Sobel operator. For example, it is possible to define a Sobel operator $S_x$ along the X-axis and a Sobel operator $S_y$ along the Y-axis. If (x, y) designate the pixels of the reconstruction image $A'_z$, the clearness indicator $q_z$ associated with each reconstruction image $A'_z$ may then be such that $$q_z = \sum_{x,y} (A'_z * S_x)^2 + (A'_z * S_y)^2$$

It is possible for:

$$S_x = \begin{bmatrix} -1 & 0 & 1 \\ -2 & 0 & 2 \\ -1 & 0 & 1 \end{bmatrix} \text{ and } S_y = \begin{bmatrix} 1 & 2 & 1 \\ 0 & 0 & 0 \\ -1 & -2 & -1 \end{bmatrix}$$

Step 138: The variation in the clearness indicator $q_z$ as a function of depth allows the distance actually corresponding to the distance $z_{ROI}$ between the detection plane $P_0$ and the sample, level with the region of interest ROI, to be identified. Depending on the clearness indicator employed, the distance $z_{ROI}$ generally corresponds to a minimum or a maximum, along the Z-axis, in the value of the clearness indicator. The distance $z_{ROI}$ is then used, in step 140, to automatically place the region of interest ROI of the sample in the focal plane of the objective 25. Manual adjustment of the focus of the objective 25 before the acquisition of the second image $I_2$ is then avoided or limited.

The complex images $A_z$ forming the stack of complex images may be obtained from a complex image, called the initial image, $A_{z=d}$ formed with a pre-established distance d between the first image sensor 16 and the sample. This initial complex image is obtained by implementing an iterative reconstruction algorithm, as described above. It is then propagated to the various reconstruction planes $P_z$ via a simple convolution with a propagation operator h. For example, a complex image $A_z$, in the reconstruction plane $P_z$, is obtained simply via the operation: $A_z = A_{z=d} * h_{d,z}$, where $h_{d,z}$ is a propagation operator representing the propagation of light between the plane $P_{z=d}$ and the plane $P_{z=z'}$. The distance between two adjacent propagation planes is set depending on the precision with which it is desired to determine the distance $z_{ROI}$ between the detection plane $P_0$ and the region of interest ROI of the sample.

One of the advantages of the first modes resides in the observed first field, the latter being extensive with respect to the field observed by a microscope objective. However, in such a field, the sample may not be rigorously parallel to the image sensor 16, as shown in FIG. 6A. Thus, during the application of the reconstruction algorithm, forming the subject matter a step 120, a reconstruction distance z may be optimal for one portion of the sample, not but not for another portion. This may lead to a degradation in the spatial resolution of the reconstructed image $I_z$. Specifically, the inventors have observed that it is optimal for the reconstruction plane $P_z$ to be the plane $P_{10}$ in which the sample 10 lies. Thus, if the reconstruction distance z does not correspond to the distance between the detection plane in the sample plane, the quality of the reconstruction is decreased.

In order to solve this problem, it is proposed, when implementing step 120, to consider not a single propagation distance z, corresponding to the distance between the sample plane $P_{10}$ and the detection plane $P_0$, but to take into account a potential variation in the distance between the sample and the detection plane. To do this, prior to step 120, the image $I_1$ acquired by the first image sensor 16 may be partitioned into various elementary portions $I_{1,w}$, each elementary portion corresponding to a reconstruction distance $z_w$, representative of the distance between the sample and the first image sensor 16 level with the elementary portion. Step 120 is then implemented separately on each elementary portion $I_{1,w}$, so as to reconstruct the exposure light wave 14 reaching the image sensor 10 level with said elementary portion, using the reconstruction distance $z_w$ associated with the elementary portion $I_{1,w}$. In other words, a reconstruction distance $z_w$ corresponding to an estimation, level with said elementary portion, of the distance between the sample plane $P_{10}$ and the detection plane $P_0$, is attributed to each elementary portion $I_{1,w}$.

However, the position of the sample with respect to the first image sensor 16 is generally not known beforehand. A calibration phase, comprising the steps shown in FIG. 6B, is implemented so as to estimate a variation in the distance between the sample 10 and the image sensor 16. These steps are the following:

Step 111: selection of a plurality of calibration points $U_n$ in the acquired first image $I_1$. It is a question of determining at least two points, and preferably at least three points, in the first image $I_1$ acquired, in step 100, by the first image sensor. These points are preferably as spaced apart from each other as possible. It may for example be a question of four points located at the corners of the first image $I_1$, to which may optionally be added one or two points at the centre of the image. The number of calibration points must be sufficiently low for the calibration to be able to be carried out rapidly. It may be comprised between 2 and 10. In FIG. 6C, 4 calibration points have been shown, said points being located at the corners of the first image $I_1$.

Step 112: definition of a calibration region V, about each calibration point. Typically, a calibration region stretches at least 10 pixels about a calibration point $U_n$. A calibration region may thus comprise 10×10 pixels, or even 20×20 pixels, or more, for example 50×50 pixels.

Steps 113 to 115 aim to implement a digital focusing algorithm, such as described above, on each calibration region $V_n$, so as to estimate a distance $z_n$ between the sample 10 and the detection plane $P_0$ level with each calibration region $V_n$.

Step 113: application of a propagation operator h to each elementary calibration region $V_n$ in order to obtain, for each thereof, a complex image $A_{n,z}$, called the calibration image, of the exposure light wave $14_n$ reaching the detection plane $P_0$ level with said elementary calibration region $V_n$, in various reconstruction planes $P_z$ respectively spaced by different distances z from the detection plane. The reconstruction planes $P_z$ are for example spaced apart by a few microns, for example 10 μm, in a distance range liable to contain the sample 10. Thus a complex image $A_{n,z}$ of the light wave $14_n$ to which the first image sensor 16 is exposed, level with the elementary calibration region $V_n$, is obtained, in the various reconstruction planes $P_z$.

Step 114: for each elementary calibration region $V_n$, association, with each reconstruction plane $P_z$, of an indicator $q_{n,z}$ of the dispersion of a so-called reconstruction image $A'_{n,z}$ obtained from the phase and/or modulus of the complex expression of the exposure light wave 14, obtained from the complex calibration image $A_{n,z}$ reconstructed in step 113. The dispersion indicator $q_{n,z}$ may be a standard deviation of the modulus or phase of the complex expression reconstructed in each reconstruction plane.

Step 115: for each elementary calibration region $V_n$, determination of a calibration distance $z_n$, depending on the various clearness indicators $q_{n,z}$. The calibration distance $z_n$ is the distance between the sample 10 and the detection plane $P_0$, level with each elementary calibration region $V_n$. Generally, this step amounts to applying a digital autofocus so as to determine the reconstruction plane P in which an image of the phase or of the modulus of the complex image $A_{n,z}$ is the clearest, this reconstruction plane then being considered to be located level with the sample 10. The clearness indicator $q_{n,z}$ may be one of those described with reference to FIG. 5. The calibration distance $z_n$ generally corresponds to one particular value of the clearness indicator, for example a minimum value or a maximum value depending on the employed clearness indicator.

Step 116: partition of the acquired first image $I_1$ into various elementary portions $I_{1,w}$, and association, with each elementary portion, of a distance $z_w$ separating the sample 10 from the detection plane $P_0$. Each of these distances is determined depending on the calibration distances $z_n$ established for each elementary calibration region $V_n$, for example via a two-dimensional interpolation. The interpolation may be a linear interpolation. The number W of elementary portions $I_{1,w}$ may be determined beforehand, or depend on the difference between various calibration distances. The greater the inclination of the sample, the higher the number of elementary portions may be.

Step 120 then comprises reconstructing the complex amplitude of the exposure light wave 14 by independently processing each elementary portion $I_{1,w}$ of the first image $I_1$. Thus, each elementary portion of the first image is propagated by the distance $z_w$ that was attributed thereto in step 116. As many reconstructions are carried out as there are elementary portions $I_{1,w}$, these reconstructions being carried out simultaneously or successively, but independently of one another. Complex images $A_{z,w}$ of the exposure light wave 14 in various elementary reconstruction planes $P_{z,w}$ are then obtained, each elementary reconstruction plane lying at the detection plane-sample distance $z_w$ that was determined level with the elementary portion $I_{1,w}$.

It is then possible to form a reconstructed image $I_{z,w}$, called the elementary reconstructed image, from the modulus or the phase of the complex image $A_{z,w}$ in the various elementary reconstruction planes $P_{z,w}$. FIG. 6D shows a cross section showing various elementary reconstruction planes $P_{z,w}$ adjacent to one another. The reconstructed images $I_{z,w}$ may be concatenated to form a reconstructed image $I_z$.

This embodiment may be used for a simple observation of the sample, by virtue of the reconstructed image $I_z$. Moreover, when a region of interest is selected then observed by a second image sensor, through an objective 25, the distances $z_w$ may be used to automatically position the selected region of interest in the focal plane of the objective 25. The fact that the position of the sample with respect to the detection plane is well known is then capitalized upon.

FIG. 7A shows a reconstructed image $I_z$ of a slide of human tissue. Various regions of interest have been shown in the image of FIG. 7A. FIGS. 7B, 7C and 7D show these regions of interest as they appear if only one single reconstruction distance is considered. FIGS. 7E, 7F and 7G show the regions of interest shown in FIGS. 7B, 7C and 7D, respectively, but after implementation of the embodiment shown in FIG. 6B. Each region of interest was obtained while making allowance for an inclination of the sample with respect to the detection plane. It may be seen that this improves spatial resolution, in particular by comparing images 7B and 7E, or 7C and 7F.

FIG. 8 shows an example of images that may be displayed on the screen 44. In the left-hand portion (1) of the screen, an image $I_z$ reconstructed from a sample formed by a slide of biological tissue has been shown, this reconstruction being based on the modulus of a complex expression reconstructed in the sample plane. In the right-hand portion (2) of the screen, a region of interest ROI selected in the reconstructed image has been shown, said image having been obtained with a microscope objective.

The invention is possibly applicable to the field of health, or to other fields in which it is necessary to obtain an overview of a sample, while allowing easy analysis of selected regions of interest of the latter. Thus, the invention is applicable to the field of environmental inspection, to food processing, to biotechnologies or to the monitoring of industrial processes.

The invention claimed is:

1. A device for observing a sample, comprising:
   a first light source configured to emit an incident light wave that propagates to the sample;
   a first image sensor configured to acquire a first image of the sample illuminated by the incident light wave;
   a sample holder configured to hold the sample between the first light source and the first image sensor such that no magnifying optics are disposed between the sample and the first image sensor, the first image sensor being exposed to an exposure light wave, the acquired first image defining a first field of view of the sample;
   a second image sensor, optically coupled to an optical system having a magnification higher than 1, the second image sensor being configured to acquire a second image of the sample, held on the sample holder, in a second field of view of the sample that is smaller than the first field of view;
   a stage configured to move the sample relative to the first image sensor and to the optical system, so as to alternate between:
      a first mode, in which the sample is disposed within a field of view of the first image sensor, so as to acquire the first image, and
      a second mode, in which the sample is disposed within a field of view of the second image sensor, so as to acquire the second image; and
   a processor configured to use a numerical propagation operator and the acquired first image, so as to:
      calculate a complex expression for the exposure light wave on a reconstruction surface lying facing the first image sensor, and
      form a reconstructed image from a modulus and/or a phase of the calculated complex expression,
   wherein, in the second mode, a position of the sample with respect to the optical system is defined depending on a region of interest selected in the reconstructed image.

2. The device of claim 1, further comprising a second light source configured to illuminate the sample during the acquisition of the second image of the sample.

3. The device of claim 1, further comprising:
   a selector configured to select a region of interest in the acquired first image, and
   a processor configured to determine a relative position of the sample with respect to the optical system, in which position the selected region of interest lies in the second field of view of the sample,
   wherein the stage is further configured to automatically position the sample relative to the optical system in the determined relative position determined by the processor.

4. The device of claim 1, wherein the first image sensor lies in a detection plane, and the device further comprises a processor configured to apply a digital focus to the acquired first image so as to estimate a distance between the sample and the detection plane in the selected region of interest, such that the determined relative position of the sample with respect to the optical system is determined depending on the estimated distance.

5. The device of claim 1,
   wherein the first image sensor and the second image sensor are fixed, and
   wherein the stage is further configured to move the sample:
      to face the first image sensor in the first mode, and
      to face the optical system in the second mode.

6. The device of claim 1, wherein the sample is fixed and the stage is further configured to move the first image sensor to face the sample in the first mode, and/or to move the optical system to face the sample in the second mode.

7. A method for observing a sample, comprising:
   a) illuminating the sample using a first light source;
   b) acquiring a first image of the illuminated sample using a first image sensor, the first image sensor being exposed to an exposure light wave, the sample being held between the first light source and the first image sensor, no magnifying optics being disposed between the first image sensor and the sample;
   c) selecting a region of interest of the sample in the acquired first image;
   d) moving the sample relative to the first image sensor and to an optical system having a magnification higher than 1, the optical system being optically coupled to a second image sensor, the movement being carried out automatically by a stage, such that the region of interest of the sample selected in step c) is within a field of view of the second image sensor; and
   e) illuminating the sample using a second light source and acquiring a second image of the region of interest of the sample, using the second image sensor,
   wherein the first image sensor lies in a detection plane, and step c) further comprises:
      ci) using a propagation operator and the acquired first image, so as to calculate a complex expression for the exposure light wave on a reconstruction surface lying facing the detection plane,
      cii) forming a reconstructed image, based on a modulus and/or a phase of the complex expression calculated in ci), and
      ciii) selecting a region of interest in the reconstructed image.

8. The method of claim 7, wherein the relative movement of the sample results in automatically passing between:
   a first mode, in which the sample is disposed within a field of view of the first image sensor, so as to acquire the first image, and
   a second mode, in which the sample is disposed within the field of view of the second image sensor, so as to acquire the second image.

9. The method of claim 7, wherein, in step c), the region of interest is selected, in the acquired first image, using a manual selector or via an analysis of the acquired first image, the analysis being based on a predefined selection criterion and being implemented by a processor.

10. The method of claim 7,
    wherein, in step ci), the propagation operator is applied to an intermediate image, obtained from the acquired first image and comprising a number of pixels lower than a number of pixels of the acquired first image, a field of view of the intermediate image being similar to a field of view of the acquired first image, and wherein step c) further comprises:
  applying a propagation operator to the acquired first image, in the region of interest selected in step ciii), so as to calculate a complex expression for the exposure light wave on a reconstruction surface lying facing the detection plane, thereby defining a complex image of interest,
  from the calculated complex image of interest, forming a reconstructed image of interest, based on the modulus and/or the phase of the complex expression, and
  displaying the reconstructed image of interest.

11. The method of claim 7, wherein, in step ciii), the region of interest is selected, in the reconstructed image, using a manual selector or via an analysis of the reconstructed image, the analysis being based on a predefined selection criterion and being implemented by a processor.

12. The method of claim 7, wherein, in step ci), the reconstruction surface is a sample plane in which the sample lies.

13. The method of claim 7, further comprising, prior to step c), calibrating a position of the sample with respect to the detection plane, the calibrating comprising:
  selecting a plurality of calibration points in the first image acquired;
  defining an elementary calibration region about each selected calibration point;
  implementing, with a processor, a digital focusing algorithm, so as to estimate a calibration distance, between the sample and the detection plane, for each elementary calibration region; and
  partitioning the first image acquired into various elementary images, and associating, with each elementary image, a distance between the sample and the detection plane, depending on the calibration distance estimated for each elementary calibration region, the partitioning comprising:
    applying a propagation operator to each elementary image, depending on the distance associated with the elementary image, so as to calculate, for each elementary image, a complex expression for the exposure light wave in an elementary reconstruction plane, and
    forming an elementary reconstructed image from the modulus or the phase of the complex expression calculated in step ci), in each elementary reconstruction plane, the reconstructed image being obtained by concatenation of each elementary reconstructed image.

14. The method of claim 13, wherein the digital focusing algorithm comprises:
  applying a numerical propagation operator to each elementary calibration region so as to obtain, for said each elementary calibration region, a calibration image, which is a complex image of the exposure light wave, the numerical propagation operation being applied in various reconstruction planes that are respectively spaced apart by various distances from the detection plane,
  for each elementary calibration region, calculating, for each reconstruction plane, an indicator of clearness of an obtained reconstructed image from the phase and/or the modulus of the complex calibration expression calculated in the reconstruction plane, and
  determining a calibration distance between the sample and the detection plane for said each elementary calibration region, depending on the calculated clearness indicators.

15. The method of claim 7, wherein step d) further comprises:
  implementing, with a processor, a digital focusing algorithm, so as to estimate a distance between the sample and a detection plane in which the image sensor lies, in the region of interest selected in step c); and
  moving the sample relative to the optical system, while taking into account the distance thus estimated, such that the sample is placed in a focal plane of the optical system.

16. The method of claim 15, wherein the digital focusing algorithm comprises:
  applying a numerical propagation operator to the first image, so as to calculate a complex expression for the exposure light wave in a plurality of reconstruction planes respectively located at various reconstruction distances from the detection plane,
  obtaining a reconstruction image at each reconstruction distance, from a phase or an amplitude of the complex expression determined in each reconstruction plane,
  determining an indicator of clearness of each reconstruction image, and
  determining the distance between the sample and the detection plane, in the region of interest, depending on the clearness indicator determined for each reconstruction image.

* * * * *